United States Patent
Wallin et al.

(10) Patent No.: US 6,919,027 B2
(45) Date of Patent: Jul. 19, 2005

(54) METHOD FOR TREATING BIO-ORGANIC AND WASTEWATER SLUDGES

(75) Inventors: Rae E. Wallin, Maitland (CA); Grant H. Mills, Mississauga (CA)

(73) Assignee: N-Viro Systems Canada, Inc., Ontario (CA)

( * ) Notice: Subject to any disclaimer, the term of this patent is extended or adjusted under 35 U.S.C. 154(b) by 90 days.

(21) Appl. No.: 10/685,492

(22) Filed: Oct. 16, 2003

(65) Prior Publication Data

US 2004/0084367 A1 May 6, 2004

(30) Foreign Application Priority Data

Nov. 1, 2002 (CA) .............................................. 2410814

(51) Int. Cl.⁷ ................................................. C02F 3/00
(52) U.S. Cl. ...................... 210/613; 210/620; 210/631; 210/751; 210/764; 210/766; 210/916
(58) Field of Search ................................ 210/612, 613, 210/620, 631, 751, 764, 766, 916

(56) References Cited

U.S. PATENT DOCUMENTS

| | | |
|---|---|---|
| 4,781,842 A | 11/1988 | Nicholson |
| 4,902,431 A | 2/1990 | Nicholson |
| 5,275,733 A | 1/1994 | Burnham |
| 5,417,861 A | 5/1995 | Burnham |
| 5,853,450 A | 12/1998 | Burnham |
| 5,853,590 A | 12/1998 | Burnham |
| 6,248,148 B1 | 6/2001 | Faulmann |
| 6,407,038 B1 | 6/2002 | Welacky |

*Primary Examiner*—Chester T. Barry
(74) *Attorney, Agent, or Firm*—Jeffrey S. Melcher; Manelli Denison & Selter, PLLC

(57) ABSTRACT

An improved process of treating sludge to provide a stable product for use as a beneficial soil or fertilizer for agricultural lands which includes the steps of: (a) mixing sludge with at least one alkaline material in an amount sufficient to raise pH of the mixture to a level of at least 12 and to increase percent solids in the mixture to at least 40% by weight, and such that odorant sludge organics and inorganics are bound to adsorbent particles of the alkaline material, (b) aerating and drying the mixture by agitation and heating to stabilize the mixture and increase the percent solids to at least 50% by weight, and (c) pasteurizing the dried mixture at a temperature at or above 52.degree. C. by application of heat resulting from an exothermic reaction of the alkaline material with water in the sludge, wherein the step (b) is carried out in a mechanical means selected from the group consisting of a drum dryer, a pelletizer, and a fluidized bed apparatus, and wherein the heat applied for drying in the step (b) reduces the amount of additional heat required for pasteurization in the step (c) thereby reducing the amount of alkaline material needed for the exothermic reaction, the improvement wherein sufficient time is allowed under step (a) prior to step (b) to enable sufficient slaking of the alkaline material in the mixture to prevent removal of the mixture as dust during step (b). The process reduces the amount of or prevents dust formation in the aeration/drying step.

14 Claims, 2 Drawing Sheets met# METHOD FOR TREATING BIO-ORGANIC AND WASTEWATER SLUDGES

FIELD OF THE INVENTION

This invention relates to a method of treating bio-organic and/or wastewater sludge that is designed to microbially decontaminate and stabilize the sludge so that it can be safely utilized as a soil amendment or fertilizer in agriculture or as a component of synthetic soil for general usage.

BACKGROUND OF THE INVENTION

Relevant prior art references for providing a full understanding of the use of bio-organic and wastewater sludges as beneficial soil or fertilizers for agricultural lands and processes for the production of treated sludges include U.S. Pat. Nos. 4,781,842; 4,902,431; 5,275,733; 5,417,861; 5,853,450; 5,853,590; 6,248,148 and 6,407,038; and references contained therein.

Of particular mention is U.S. Pat. No. 5,853,590 which describes a method of treating sludge to provide a stable product for use as a beneficial soil or fertilize for agricultural lands, which includes the steps of (a) mixing sludge with at least one alkaline material in an amount sufficient to raise the pH of the mixture to a level of at least 12 and to increase the percent of solids in the mixture to at least 40% by weight, and such that the odorant sludge organics and inorganics are bound to adsorbent particles of the alkaline material, (b) aerating and drying the mixture by agitation and heating to stabilize the mixture and increase the percent solids to at least 50% by weight, and (c) pasteurizing the dried mixture at a temperature at or above 52.degree. C. by application of heat resulting from an exothermic reaction of the alkaline material with water in the sludge, wherein said step (b) is carried out in a mechanical means selected from the group from the group consisting of a drum dryer, a pelletizer, and a fluidized bed apparatus, and wherein the heat applied for drying in said step (b) reduces the amount of additional heat required for pasteurization in said step (c) thereby reducing the amount of alkaline material needed for said exothermic reaction.

Wastewater sludge is a sludge comprised of the solids portion of the inflow of a wastewater treatment plant that normally is comprised of microorganisms, organics and inorganic precipitates that are separated from the water effluent discharge from the plant. This sludge is often unprocessed beyond a concentration process and is termed a raw sludge. Other sludges from a wastewater plant have been processed and are considered digested sludges or secondary or waste-activated sludges or combined sludges.

Bioorganic sludge is an organic sludge comprised of a material or materials selected from the group: sludges resulting from production of antimicrobials and other pharmaceutical products, bacterial fermentation sludges, sludges resulting from production of beer and wine, mushroom compost waste, paper mill sludges, sludges that contain microorganisms that have resulted from recycled organic products such as paper products, sludges resulting from the growth of microorganisms for the production of chemicals and organics, industrial sludges and byproducts resulting from the production of microbial products and foodstuffs, sludges resulting from the animal slaughter industry—particularly if these are digested or otherwise broken down by microorganisms.

Organic sludge is a sludge derived from industrial products and byproducts that are comprised in the majority microbially degradable organic materials not of biological or microbiological origin. This definition would include sludges comprised of recycled organic products such as recycled paper and paper products.

Preliminary or pretreatment is the very first stage of sludge treatment, involving, the removal of larger materials and grit that if not removed could hinder subsequent treatment processes. It is accomplished through the use of equipment such as bar screens, macerators, comminutors, racks and grit removal systems.

Primary treatment is usually comprised of preliminary treatment followed by primary clarifiers which remove approximately 50% suspended solids and 35–40% B.O.D.5. This is accomplished by channeling flows through large tanks with residence times of 2–4 hours, thus allowing suspended solids to settle. Post disinfection and a biosolids treatment process are normally included. Enhanced Primary Treatment can be performed by the addition of a coagulant such as ferric chloride along with a polymer, improving the degree of S.S. and B.O.D. removal to 80% and 60% respectively.

Secondary treatment involves a primary process and a biological treatment stage. There are many biological processes in the treatment operation with the majority being variations of fixed film and mixed culture applications. The activated sludge process (mixed) is achieved by establishing large diversified cultures of bacteria. The bacteria metabolizes and provides the enzymatic breakdown of organic components, i.e., liquids, carbohydrates, proteins and cellulose, in the wastewater. 90% removal rates of B.O.D. and suspended solids are typical of secondary treatment.

However, although the manufacturing process described in aforesaid U.S. Pat. No. 5,853,590 provides an improvement in the art, it suffers from a drawback of allowing dust particles of the alkaline treated sludge to be carried off during the air-drying step of the process and create an unsafe environment.

Surprisingly, we have discovered that the aforesaid drawback can be overcome by a modification that provides for the prevention of such dust formation.

SUMMARY OF THE INVENTION

It is an object of the present invention to provide a process of beneficial sludge treatment that reduces or prevents the formation of dust during the aeration/drying stage.

An essential chemical reaction of the alkaline treatment of the sludge is the slaking of the lime ingredient with the water content of the sludge, to, in effect, form slaked lime which enhances the fixing, i.e. adsorbing of the odorant sludge organic and inorganic materials to the alkaline material particles. Although the water content in the resultant alkaline sludge mixture is more than ample to effect total fixing of the aforesaid organic and inorganic materials it has been found that dust of the mixture produced during the subsequent aerating and drying step is disadvantageously carried off. Increasing the water content in the mixture is most disadvantageous in that it must be subsequently removed in the drying process which significantly adds to the operating costs through increased thermal energy costs and increased drying time necessary. In fact, to date, according to the prior art, the water content of the alkaline sludge admixture produced is, theoretically, more than ample to effect total slaking.

Surprisingly, we have found that significant dust reduction or prevention can be achieved without the addition of water, while not disturbing the defined chemical and physical parameters according to the invention as hereinafter defined.

We have found that if the alkaline sludge mixture is allowed extra time over that according to the prior art to effect better fixing of the mixture, prior to the aeration and drying step, significant dust reduction or prevention can be achieved.

Accordingly, the invention provides in one aspect a method of treating sludge to provide a stable product for use as a beneficial soil or fertilizer for agricultural lands which includes the steps of (a) mixing sludge with at least one alkaline material in an amount sufficient to raise pH of the mixture to a level of at least 12 and to increase percent solids in the mixture to at least 40% by weight, and such that odorant sludge organics and inorganics are bound to adsorbent particles of the alkaline material, (b) aerating and drying the mixture by agitation and heating to stabilize the mixture and increase the percent solids to at least 50% by weight, and (c) pasteurizing the dried mixture at a temperature at or above 52.degree. C. by application of heat resulting from an exothermic reaction of the alkaline material with water in the sludge, wherein said step (b) is carried out in a mechanical means selected from the group consisting of a drum dryer, a pelletizer, and a fluidized bed apparatus, and wherein the heat applied for drying in said step (b) reduces the amount of additional heat required for pasteurization in said step (c) thereby reducing the amount of alkaline material needed for said exothermic reaction, the improvement wherein sufficient time is allowed under Step (a) prior at step (b) to enable sufficient slaking of said alkaline material in said mixture to prevent removal of said mixture as dust during step (b).

We have found that an overall mixing prior to aeration/drying time of at least 3 minutes, preferably 15 minutes and, more preferably, at least 30 minutes achieves the aforesaid object of the invention.

We have found that the process of the invention as, hereinabove defined, is of value also with enhanced primary treated sludge which contains coagulants and polymers. Although these additives have individual dehydration/hydration characteristics in the alkaline mixture, the rate of slaking within such a mixture, a priori, could not have been predictable as to teach a time of slaking process of value in the practice of the present invention.

Accordingly, the invention provides a process as hereinabove defined wherein the sludge is enhanced primary sludge.

The process according to the invention comprises the steps and apparatus according to the prior art as embodied in aforesaid U.S. Pat. No. 5,853,590 modified to provide for further time for reaction of the water in the sludge with the alkaline material prior to the aeration and drying step. This extra time over that disclosed in the prior art may be in the mixer alone or in conjunction therewith, for example as in a static mixer per se, a feed hopper or conveyor belt apparatus by which the alkaline mixture is fed to the aerator/dryer, either in a batch or, most preferably, continuous manner.

BRIEF DESCRIPTION OF THE DRAWINGS

In order that the invention may be better understood, a preferred embodiment will now be described by way of example only, with reference to the accompanying drawings, wherein.

DETAILED DESCRIPTION OF A PREFERRED EMBODIMENT

Figure 1:
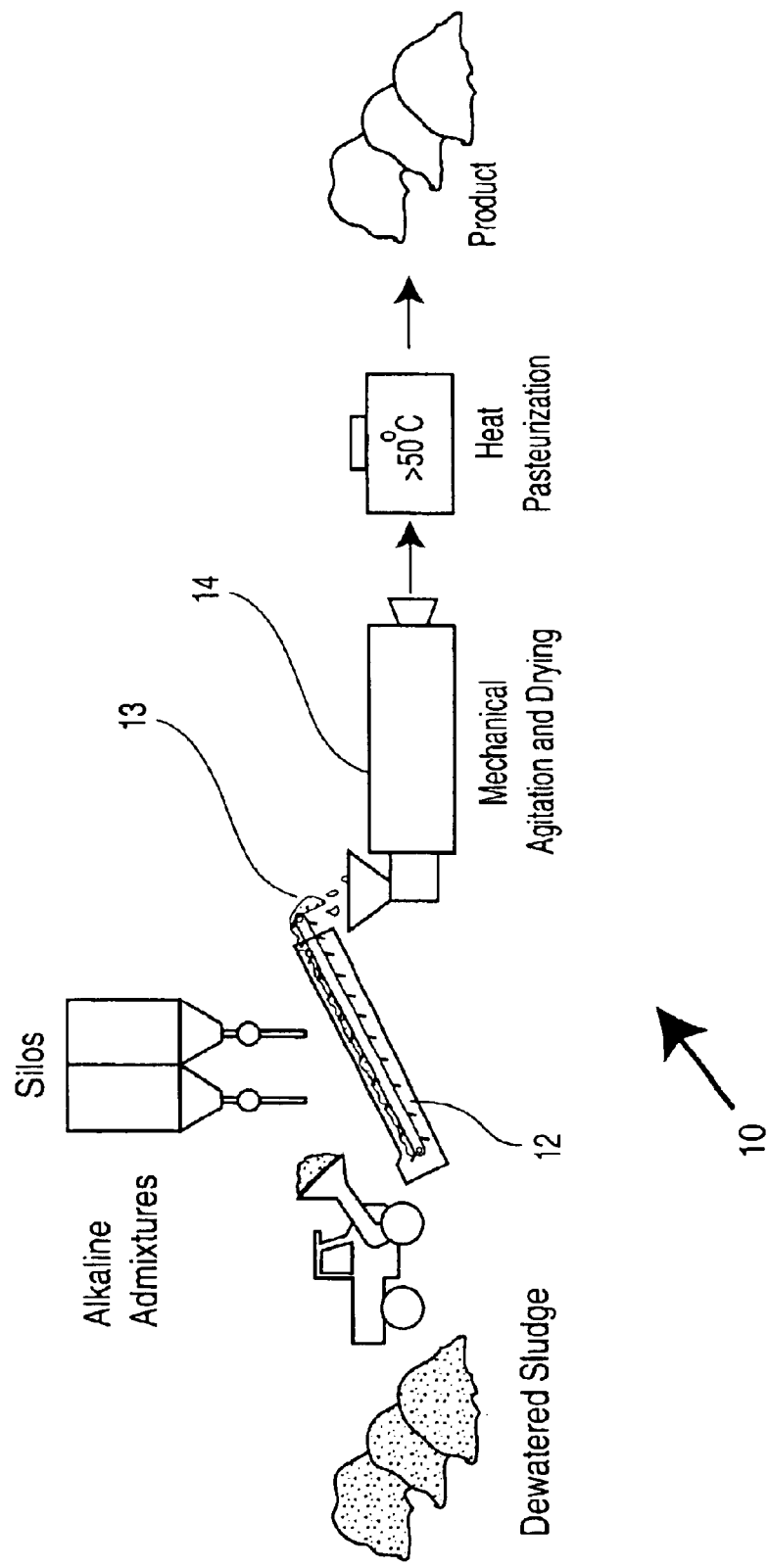
FIG. 1 is an overall schematic for a process in accordance with the prior art.

FIG. 1 shows prior art apparatus and process according to U.S. Pat. No. 5,853,590 generally as 10 wherein specifically dewatered sludge and alkaline admixtures are mixed in mixer 12 for an indeterminate period of time, typically, 0.5 to 1.0 minutes at a throughput rate of, generally 10–50 tons/hr, preferably, 15 tons/hr, and the resultant mixture 13 fed to dryer 14. This process is known to produce dust particles in dryer 14.

Figure 2:
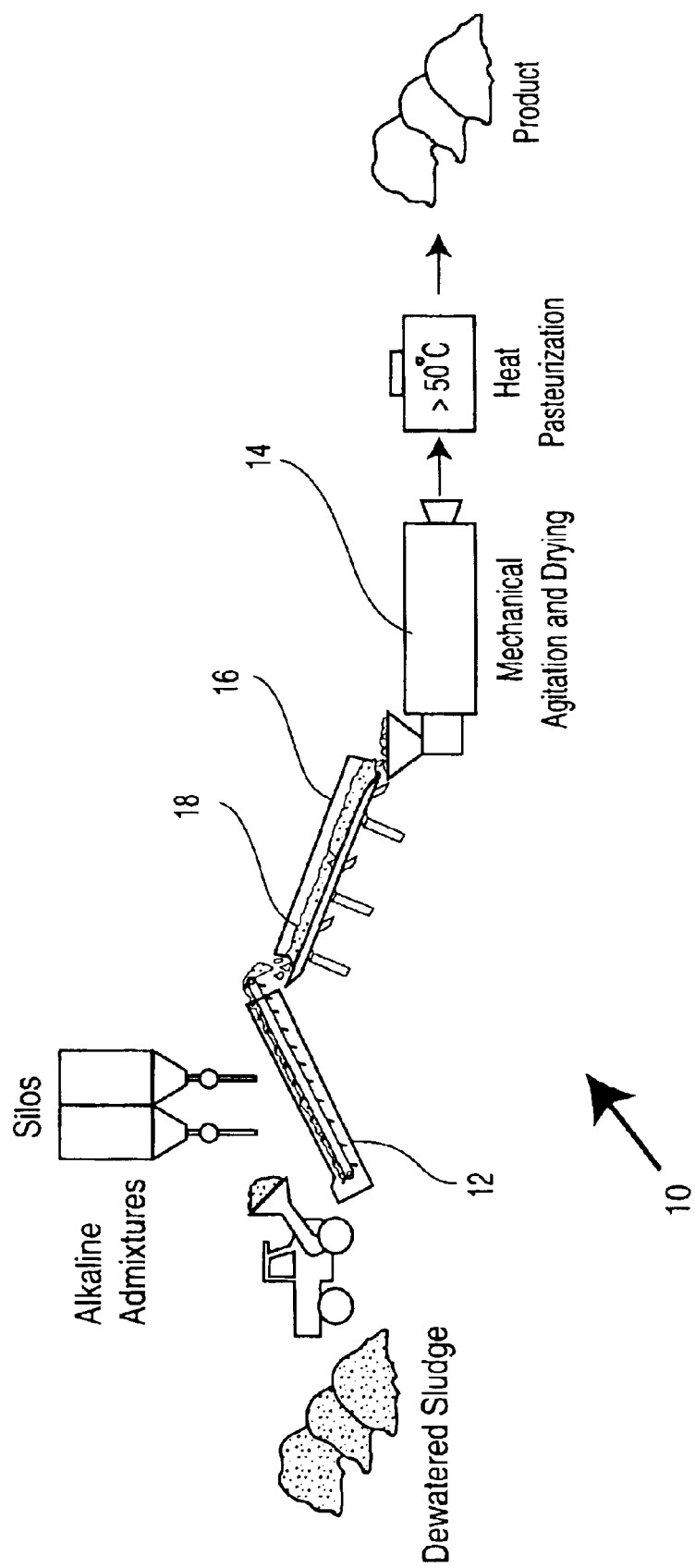
FIG. 2 is an overall schematic for a process in accordance with the invention; and wherein the same numerals denote like parts.

FIG. 2 shows a modified continuous operation and process of FIG. 1, wherein conveyor system 16 is used to transport alkaline enhanced primary treated sludge 18 to dryer 14 at a slow enough rate sufficient to allow full efficacious slaking, while at a fast enough rate to meet the demands of dryer 14 and satisfy the desired economics of the continuous process. Typical times are at least 3 minutes, preferably 15 minutes and more preferably 30 minutes. The resultant operative rate of mixture feed to dryer 14 can be met by judicious selection of conveyor dimensions and speed, for the same throughput rates according to the prior art.

Thus, we have found that dust significant reduction or prevention can be achieved according to the process of the invention in an economical, efficient manner.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

What is claimed is:

1. An improved process of treating sludge to provide a stable product for use as a beneficial soil or fertilizer for agricultural lands which includes the steps of:
   (a) mixing sludge with at least one alkaline material in an amount sufficient to raise pH of the mixture to a level of at least 12 and to increase percent solids in the mixture to at least 40% by weight, and such that odorant sludge organics and inorganics are bound to adsorbent particles of the alkaline material,
   (b) aerating and drying the mixture by agitation and heating to stabilize the mixture and increase the percent solids to at least 50% by weight, and
   (c) pasteurizing the dried mixture at a temperature at or above 52° C. by application of heat resulting from an exothermic reaction of the alkaline material with water in the sludge, wherein said step (b) is carried out in a mechanical means selected from the group consisting of a drum dryer, a pelletizer, and a fluidized bed apparatus, and wherein the heat applied for drying in said step (b) reduces the amount of additional heat required for pasteurization in said step (c) thereby reducing the amount of alkaline material needed for said exothermic reaction, the improvement wherein sufficient time is allowed under step (a) prior to step (b) to enable sufficient slaking of said alkaline material in said mixture to prevent removal of said mixture as dust during step (b).

2. A process as defined in claim 1 wherein said sufficient time is at least 3 minutes.

3. A process as defined in claim 2 wherein said sufficient time is at least 15 minutes.

4. A process as defined in claim 3 wherein said sufficient time is at least 30 minutes.

5. A process as defined in claim 1 wherein the sludge is selected from the group consisting of raw primary wastewater sludge, enhanced primary treated sludge, digested wastewater sludge, secondary wastewater sludge, combined wastewater sludge, a product of an industrial process that includes microbial cells or components, bioorganic sludges, organic sludges, and mixtures thereof.

6. A process as defined in claim 5 wherein said sludge is enhanced primary treated sludge.

7. A process as defined in claim 1 wherein following said step (c) the product is maintained for a time sufficient to allow the microbial population of the sludge to establish and to commence catabolism of the organics present in the mixture, to continue the odor reduction initially begun by the addition of the adsorptive material, to prevent regrowth of pathogenic organisms, and to continue to carbonate any residual calcium hydroxide or calcium oxide components to form a stable product.

8. A process as defined in claim 1 wherein the mixture is mechanically cooled and aerated following said step (c).

9. A process as defined in claim 1 comprising the additional step of product carbonation of the pasteurized mixture by air which contains $CO_2$ or by a gas containing a concentration of $CO_2$ greater than that of air.

10. A process as defined in claim 1 comprising the additional step (d) of: controlling microbial content of the mixture by adding a sufficient quantity of agricultural soil containing an indigenous microflora within the range of about $10^5$ to $10^{10}$ aerobic bacteria and about $10^4$ to $10^7$ fungi per gram soil solids.

11. A process as defined in claim 10 wherein the microflora added to the sludge mixture includes bacteria produced in controlled cultures and are selected from indigenous bacterial and fungal microflora of agricultural soils.

12. A process as defined in claim 11 wherein the microflora added includes members of the actinomycete class of bacteria.

13. A process as defined in claim 10 wherein the microflora added to the sludge mixture are obtained from a stored sludge product resulting from the method.

14. A process as defined in claim 1 wherein said step (c) includes the step of heating the mixture to a temperature within the range of 52° C. to 100° C.

* * * * *